(12) United States Patent
Chan

(10) Patent No.: US 9,369,203 B1
(45) Date of Patent: Jun. 14, 2016

(54) WIRELESSLY POWERED PASSIVE OPTICAL POWER METER

(71) Applicant: Google Inc., Mountain View, CA (US)

(72) Inventor: Yut Loy Chan, San Jose, CA (US)

(73) Assignee: Google Inc., Mountain View, CA (US)

( * ) Notice: Subject to any disclaimer, the term of this patent is extended or adjusted under 35 U.S.C. 154(b) by 216 days.

(21) Appl. No.: 14/301,860

(22) Filed: Jun. 11, 2014

(51) Int. Cl.
*H04B 10/08* (2006.01)
*H04B 10/079* (2013.01)
*H04B 10/2575* (2013.01)

(52) U.S. Cl.
CPC ...... *H04B 10/07955* (2013.01); *H04B 10/2575* (2013.01)

(58) Field of Classification Search
CPC .......... H04B 10/07955; H04B 10/079; H04B 10/0791; H04B 10/0771; H04B 10/0795; H04B 10/0775; H04B 10/0793
USPC .......... 398/38, 33, 66, 68, 72, 79, 25, 26, 27, 398/115, 16, 10, 13, 9, 20; 356/73.1
See application file for complete search history.

(56) References Cited

U.S. PATENT DOCUMENTS

| | | | |
|---|---|---|---|
| 5,760,391 A | 6/1998 | Narendran | |
| 7,027,730 B2 * | 4/2006 | Nagayama | H04B 10/077 398/37 |
| 7,995,915 B2 * | 8/2011 | Ruchet | H04B 10/079 398/13 |
| 8,487,478 B2 | 7/2013 | Kirby | |
| 8,532,482 B2 | 9/2013 | Yang | |
| 8,558,412 B2 | 10/2013 | Kim | |
| 2011/0264295 A1 | 10/2011 | Schmelcher | |
| 2013/0264880 A1 | 10/2013 | Kim | |

FOREIGN PATENT DOCUMENTS

| | | |
|---|---|---|
| CN | 101829764 A | 9/2010 |
| EP | 2642628 A1 | 9/2013 |
| WO | WO2013151259 A1 | 10/2013 |

OTHER PUBLICATIONS

Nikitin et al., "Theory and Measurement of Backscattering from RFID Tags," 2006, [online][Retrieved on Jun. 11, 2014]; Retrieved from the Internet URL: http://www.ee.washington.edu/people/faculty/nikitin_pavel/papers/APmag_2006.pdf, 8 pages.

* cited by examiner

*Primary Examiner* — Hanh Phan
(74) *Attorney, Agent, or Firm* — Fish & Richardson P.C.

(57) ABSTRACT

Systems and apparatus for a wirelessly-powered passive optical power meter device. In one aspect, an optical power meter device comprises a power circuit connected to one or more antennas, the circuit including an RF to DC converter that generates a DC power signal that provides a DC power source for the optical power meter from an RF signal received by the one or more antennas, a photodetector that generates a power measurement signal that measures the power of the optical input signal, and a communication circuit that is connected to the one or more antennas, the photodetector, and the power circuit that when powered by the DC power source generates a modulation signal that is responsive to the power measurement signal and that causes the one of the one or more antennas to convey the power measurement signal to a reader device that is transmitting the RF signal.

18 Claims, 5 Drawing Sheets

WIRELESSLY POWERED PASSIVE OPTICAL POWER METER

BACKGROUND

Internet usage and network traffic have evolved over the past decade. Networks are often required to support larger file sizes that are continuously transferred across the network. As such traffic continues to grow, demands for better and faster connectivity continues to grow as well. Providers and users have turned to fiber-to-the-Home (or FTTH) networks to support these demands.

Fiber-to-the-Home or FTTH connections are fiber optic cable connections that are routed to individual residences. Such connections are capable of transferring larger volumes of digital information at higher speeds and more efficiently than traditional coaxial cables, at a comparable price. Two types of optical networks are active optical network (AON) architectures or passive optical network (PON) architectures.

Active optical networks utilize electrical based switches and equipment to route and distribute optical signals. Each signal is routed using the electrical switches and equipment, to its intended user or residency. The electrical and optical hybrid nature of AONs require optical to electrical transformations and electrical to optical transformations. Such transformations require additional resources and contribute to reducing the overall speed of the network.

Passive optical networks utilize passive beam splitters to divide the optical signal among a plurality of users or residencies. The passive beam splitters are un-powered devices. The passive beam splitters enable the point to multipoint optical connection between the optical line terminal and a group of users or residencies.

SUMMARY

This specification relates to passive optical power meter devices. In particular, the specification relates to such a device that is powered wirelessly and provides measurements wirelessly. The subject matter of this application describes systems comprising such a device and their operation.

In general, one innovative aspect of the subject matter described in this specification can be embodied in a system including, an optical power meter comprising, one or more antennas; a power circuit connected to one of the one or more antennas, the circuit including an RF to DC converter that generates a DC power signal that provides a DC power source for the optical power meter from an RF signal received by the one or more antennas; an optical input port that receives an optical input signal; a photodetector coupled to the power circuit and when powered by the DC power source generates a power measurement signal that measures the power of the optical input signal; a communication circuit that is connected to the one or more antenna, the photodetector, and the power circuit and when powered by the DC power source generates a modulation signal that is responsive to the power measurement signal and that causes the one of the one or more antennas to convey the power measurement signal to a reader device that is transmitting the RF signal.

Another innovative aspect of the subject matter described in this specification can be embodied in an optical power meter comprising, one or more antennas; a power circuit connected to one of the one or more antennas, the circuit including an RF to DC converter that generates a DC power signal that provides a DC power source for the optical power meter from an RF signal received by the one or more antennas; an optical input port that receives an optical input signal; a photodetector that generates a power measurement signal that measures the power of the optical input signal; a communication circuit that is connected to the one or more antenna, the photodetector, and the power circuit and when powered by the DC power source generates a modulation signal that is responsive to the power measurement signal and that causes the one of the one or more antennas to convey the power measurement signal to a reader device that is transmitting the RF signal, wherein the optical power meter comprises a first and a second antenna; wherein the first antenna is connected to the power circuit such that receiving the RF signal by the first antenna causes the power circuit to generate a DC power signal; wherein the second antenna is connected to the communication circuit; and wherein the communication circuit generates and transfers, by the second antenna to the reader device, a modulated signal specifying the power measurement signal to the reader device, in response to being powered by a DC power signal from the power circuit.

Another innovative aspect of the subject matter described in this specification can be embodied in an optical power meter comprising, one or more antennas; a power circuit connected to one of the one or more antennas, the circuit including an RF to DC converter that generates a DC power signal that provides a DC power source for the optical power meter from an RF signal received by the one or more antennas; an optical input port that receives an optical input signal; a photodetector that generates a power measurement signal that measures the power of the optical input signal; a communication circuit that is connected to the one or more antenna, the photodetector, and the power circuit and when powered by the DC power source generates a modulation signal that is responsive to the power measurement signal and that causes the one of the one or more antennas to convey the power measurement signal to a reader device that is transmitting the RF signal, wherein the optical power meter comprises a first antenna, the first antenna being connected to the power circuit such that receiving the RF signal by the first antenna causes the power circuit to generate a DC power signal, the first antenna being also connected to the communication circuit; wherein the communication circuit when powered modulates an impedance connected to the antenna such that modulation, in turn, alters a backscattered RF signal, the backscattered RF signal being produced by the RF signal, the RF signal being transmitted from the reader device; wherein the backscattered RF signal is altered to be encoded with data specifying the power measurement signal to the reader device.

Another innovative aspect of the subject matter described in this specification can be embodied in a system including, an optical power meter comprising, one or more antennas; a power circuit connected to one of the one or more antennas, the circuit including an RF to DC converter that generates a DC power signal that provides a DC power source for the optical power meter from an RF signal received by the one or more antennas; an optical input port that receives an optical input signal; a photodetector that generates a power measurement signal that measures the power of the optical input signal; a communication circuit that is connected to the one or more antenna, the photodetector, and the power circuit and when powered by the DC power source generates a modulation signal that is responsive to the power measurement signal and that causes the one of the one or more antennas to convey the power measurement signal to a reader device that is transmitting the RF signal, the system further including an optical power reader comprising, a display device; one or more antennas; and a communication circuit that is connected to the one or more antennas and the display device, the communication circuit being a circuit that produces an RF signal for transmission by the one or more antennas to the optical power meter, and also being a circuit that receives an RF signal from the optical power meter and in response to receiving the RF signal from the optical power meter, at the one or more antennas, produces a signal that causes the display device to display data encoded in received RF signal, the data comprising a power measurement signal.

Particular embodiments of the subject matter described in this specification can be implemented so as to realize one or more of the following advantages. Power monitoring can be accomplished in a fiber optic network without interrupting service. Because the measurements are obtained in a non-disruptive manner, service time is also reduced. Additionally, power monitoring can be achieved without requiring a dedicated AC or DC power line for operation.

Particular embodiments of the subject matter can be installed inside a permanent structure (e.g. underground, inside a wall). Also, power measurements can be obtained without pre-setup procedures. Power measurements can be obtained wirelessly and from a distance. Because of the flexibly described above, the embodiments of the subject matter can support a wide variety of optical networks that are installed in different locations and in different structures.

Finally, particular embodiments of the subject matter allow for simultaneous measuring of multiple test points, which in turn contributes to further reducing setup and measurement time.

The details of one or more embodiments of the subject matter described in this specification are set forth in the accompanying drawings and the description below. Other features, aspects and advantages of the subject matter will become apparent from the description, the drawings and the claims.

BRIEF DESCRIPTION OF THE DRAWINGS

Like reference numbers and designations in the various drawings indicate like elements.

DETAILED DESCRIPTION

The subject matter below relates to systems and methods where wirelessly powered passive optical power meters are used in combination with wireless readers to obtain optical power measurements in an optical network. This arrangement allows for obtaining measurements within both AONs and PONs.

One maintenance procedure of PONs is the monitoring or measuring particular attributes, such as power, in a particular branch of the network. Active monitoring or measurements within PONs may result in service interruptions for more than one user or residency. Accordingly, an interposed passive device for monitoring and measuring optical attributes of branches of PONs that would not result in service interruptions enhances the network performance and improve the user experience. However, frequently connecting and disconnecting such devices to the network can in itself create service interruptions for more than one user.

PONs rely on un-powered network elements, such as the passive beam splitters discussed above. The un-powered nature of the PON networks provides no power source for powering maintenance devices such as optical power meters. Therefore, maintenance devices need to receive electrical power from an external source. Accordingly, a wirelessly powered passive optical power meter can be implemented in PON networks. This arrangement allows for the advantageous placement of optical meters within the PON network branches, such that service interruptions are eliminated.

Figure 1:
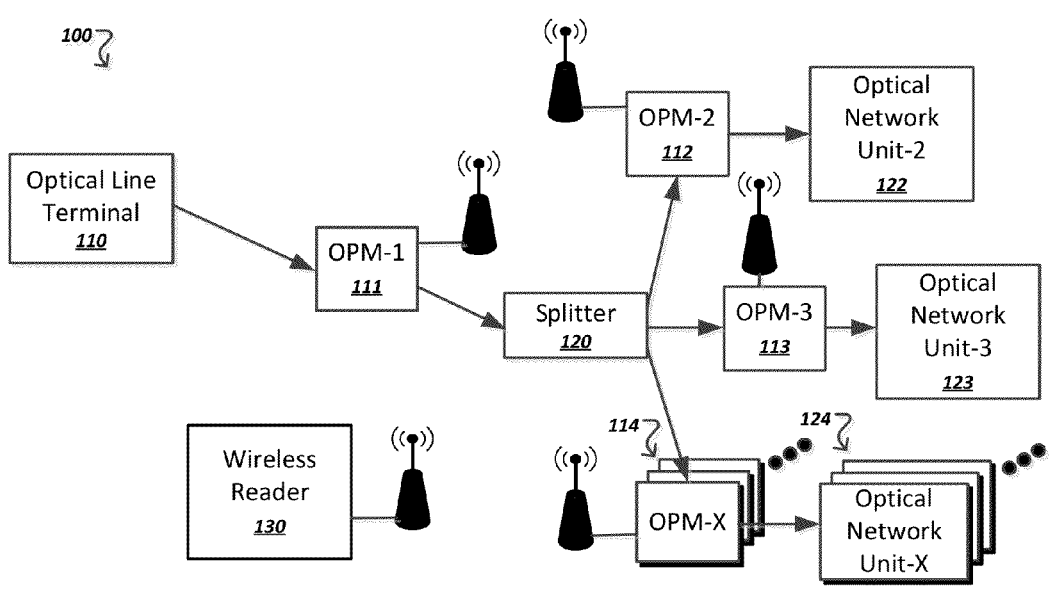
FIG. 1 is a block diagram of an example environment in which wireless powered passive optical power meters are used.

FIG. 1 is a block diagram of an example environment in which wireless powered passive optical power meters (OPMs) are used. The network 100 is a PON comprising a beam splitter 120 that distributes an optical signal to a plurality of optical network units (122-124.) The optical line terminal (OLT) 110 combines various electrical signals into a single optical signal. For example, the OLT can multiplex an electrical Ethernet signal and an electrical video signal for transmission over the PON 100. The optical signal is divided among the optical network units (122-124) according to a pre-specified ratio via beam splitter 120. For example, the beam splitter 120 may divide the optical signal equally among the optical network units (ONUs). Alternatively, the beam splitter 120 may divide the signal among optical network units (122-124) such that optical network unit-3 123 receives a largest portion of the optical signal. The PON may operate at different wavelengths. For example, the PON may operate at 1550 nm wave length. In a different implementation, the PON may utilize wavelength division multiplexing (WDM) to operate at multiple wavelengths simultaneously.

In some implementations, optical power meters are interposed between elements of the PON. For example, optical power meter OPM-1 111 is interposed between the OLT 110 and the beam splitter 120. OPM-2 is interposed between the beam splitter 120 and optical network unit-2. Similarly OPM-3 is interposed between the beam splitter 120 and optical network unit-3, while OPM-X is interposed between the beam splitter 120 and optical network unit-x. As shown in FIG. 1, the separate branches of the PON 100 include different OPMs. Each OPM (111-114) within PON 100 is equipped with a wireless system capable of receiving and transmitting wireless RF signals. The OPMs (111-114) are further configured to receive power via an RF signal wirelessly, such that receiving an RF signal at an OPM causes the OPM to produce an electrical voltage that powers the OPM. The wireless reader 130 is also equipped with a wireless system capable of receiving and transmitting wireless RF signals.

In some implementations, each branch of the PON 100 includes an OPM. As discussed above, the OPMs are wirelessly powered. The OPMs are also passive devices that produce an optical output signal that is substantially the same as the optical input signal, except for component losses. For example, an OPM may output 97% of the input optical signal due to tap loss, manufacturing imperfections, dissipation, and noise. In some implementations the losses may be less, while in other implementations the losses may be as high as 10%. This arrangement provides the ability to monitor power and other signals in a PON without interrupting the service.

The following example will be discussed with reference to the branch were OPM-1 111 resides in FIG. 1. First, when OPM-1 111 is not receiving any radio signal, the OPM 111 is not powered. As described above, because the OPM 111 is a passive device, the OPM 111 will output an optical signal that is substantially the same as the input optical signal. Accordingly, the optical signal will be transmitted through OPM-1 111 from the OLT 110 to the beam splitter 120.

Second, when a reading is required from OPM-1 the wireless reader 130 generates and transmits an RF signal to the OPM-1 111. In turn, the receipt of the RF signal by the OPM 111 results in the powering of the OPM 111. The RF signal may be further encoded with an ID query requesting that OPM-1 returns an OPM ID and one or more specific measurements, such as, a power and/or a temperature reading. In response to receiving the RF signal and being powered, the OPM 111 performs various operations that include, for example, measuring the attributes specified in the ID query. For example, OPM-1 111 may measure the power of the optical signal passing through the meter and the surrounding temperature in response to receiving the RF signal and being powered. After the required measurements are obtained, OPM-1 111 transmits an RF signal encoded with the measurements and the OPM ID of OPM-1 111 to the wireless reader 130. For example, OPM-1 111 may transmit an RF signal encoded with the power measurement, the temperature measurement, and the OPM ID for OPM-1 111 back to the wireless reader. In turn, the wireless reader receives the encoded RF signal and decodes the RF signal to extract the encoded measurements and OPM ID. Finally, the measurements along with the OPM ID may be displayed on a display section of the wireless reader. For example, in response to receiving the RF signal from OPM-1 111 the reader device may display the power measurement, the temperature measurement, and the OPM ID for OPM-1 111. Since each OPM is associated with a unique ID and a particular branch, the unique ID specifies that the accompanied measurements correspond to the branch associated with that unique ID.

FIG. 1 shows a single wireless reader 130; however, multiple wireless readers may operate simultaneously. For example, while wireless reader 130 is obtaining measurements from OPM-1 111, a second reader (not shown) may obtain measurements from OPM-2 112. Because OPMs are passive devices, each OPM (111-124) will output an optical signal that is substantially the same as the input optical signal when the OPMs are powered or un-powered. Therefore, obtaining measurements from the OPMs does not interrupt the PON operation.

Figure 2:
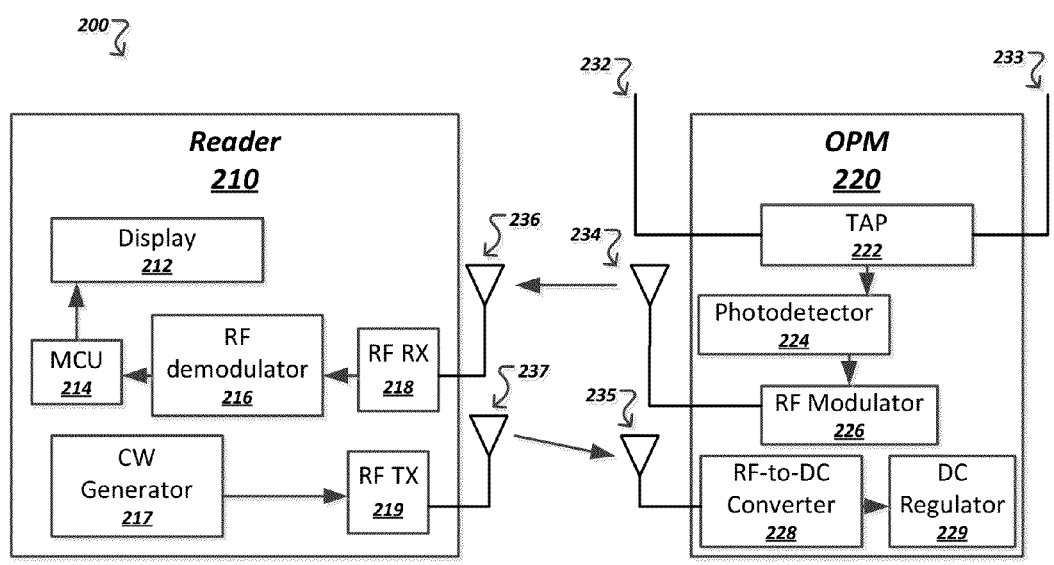
FIG. 2 is a block diagram of an example implementation of a system comprising a wireless powered passive optical power meter comprising two antennas, and a wireless reader.

FIG. 2 is a block diagram of an example implementation of a system comprising a wireless powered passive optical power meter comprising two antennas, and a wireless reader. In one implementation, the system 200 includes a wireless powered passive optical power meter OPM 220 that is configured to operate in conjunction with the reader 210.

The OPM 220 includes an optical input port 232 and an output optical port 233. The optical input port 232 receives an optical input to the OPM 220. Tap 222 is designed to tap the fiber between input port 232 and output port 233. In some implementations, using a beam splitter, the tap 222 diverts a small amount of the input to the photodetector 222, while the rest of the input is routed to output port 233. The sensitivity of the photodetector 222 dictates how much of the input signal has to be diverted to the photodetector. For example, a sensitive photodetector may require only 1% of the input signal, while a photodetectors with low sensitivity may require 5% of the input signal. In one implementation, the tap 222 utilizes the stress properties of fiber, to create stress in the fiber, and arrange the photodetectors such that the leakage of the input signal due to the introduced stress is measured by the photodetectors. Other methods to tap the input to the OPM 220 may be used such that the OPM 220 remains substantially passive.

Photodetectors are commonly used to convert optical signals into electrical signals. In some implementations, the photodetector operates by converting light signals to either electrical voltage or current. The photodetectors is designed to absorb photons. The result of the absorption of photons is the creation of electron-hole pairs in a semiconductor's depletion region. In some implementations photodetectors are photodiodes. In different implementations the photodetectors are phototransistors. Alternatively, other optical devices similar to photodetectors may be used.

In one implementation the DC electrical output of the photodetector 224 is directly transferred to an RF modulator 226. In one implementation communication circuitry includes RF modulator 226. The RF modulator 226 receives a signal either encoded with the power measurement directly from the photodetector 224, or encoded with the power measurement. The RF modulator modulates the received signal for wireless transmission to the reader 210 via antenna 234.

The OPM 220 includes an antenna 235 connected to power circuitry. The power circuitry is configured to power the OPM 220 in response to receiving an RF signal from reader 210. The power circuitry includes an RF-to-DC converter 228 that is connected to antenna 235. The RF signal received by the antenna 235 is transmitted to the RF-to-DC converter 228, which in turn produces a DC voltage. The RF-to-DC converter 228 is also connected to a DC regulator 229. The DC voltage is transmitted to the DC regulator to ensure that the DC voltage is modified to provide appropriate voltage to each of the elements of the OPM 220. For example, the voltage may be converted to a higher voltage level. The DC regulator is connected, directly or indirectly, to each element of the OPM 220 that requires power. This configuration allows the components of OPM 220 to be powered wirelessly in response to receiving an RF signal at antenna 235. For example, the output of DC regulator 229 powers the photodetector 224, and RF modulator 226, and in some implementations the MCU 235. Therefore the operations described above regarding the photodetectors, and communication circuitry occurs in response to the OPM being powered by an RF signal from the reader 210.

In some implementations, simple electrical circuit elements may be interposed between the elements shown in FIG. 2. For example, a capacitor (not shown) may be placed between the RF-to-DC converter and the DC regulator to further regulate the DC signal. Other electrical circuit elements include, but are not limited to, resistors, transistors, inductors and switches.

The reader 210 of FIG. 2 provides multiple functions that include providing power to the OPM 220, receiving and demodulating RF signals from OPM 220, and displaying measurements corresponding to signals received from OPM 220. In some implementations the reader 210 is a portable wireless device that is internally powered by, for example, one or more batteries. In different implementations, the reader 210 is a stationary device that, for example, resides at a maintenance station and is in communication with one or more OPMs, such as OPM 220.

In some implementations, the OPM 220 includes a continuous wave signal generator or a CW generator 212. The CW generator 212 generates a continuous RF signal, in response to user instructions to reader 210. For example, CW generator 212 may generate a 915 MHz RF signal in response to a user pushing a button (not shown) on reader 210, the button being for activating and obtaining measurements from OPM 220. The CW generator 212 is connected to RF transmitter or RF TX 219. RF TX 219 prepares the RF signals for transmission via antenna 237, which is also connected to RF TX 219. For example, the signal generated by CW generator 212 is received by RF TX 219, and in turn, transmitted through antenna 237 to antenna 235 of the OPM 220. As discussed above, the signal received at antenna 235 from antenna 237, provides power through power circuitry to OPM 220.

Also as discussed above, a signal encoded with, at least, a power measurement is transmitted from antenna 234 of OPM 220 to antenna 236 of reader 210. The antenna 236 is connected to an RF receiver RF RX 218. RF RX 218 is also connected to RF demodulator 216. The receiver RF RX 218 receives the signal encoded with the power measurement via antenna 236 and provides the signal to RF demodulator 216 for demodulation. The RF demodulator 216 demodulates the received signal to extract information from the received signal, such as, the power measurement. The RF demodulator 216 is also connected to MCU 214. The demodulated signal is provided to MCU 214. An analogue to digital converter (not shown) may be interposed between the MCU and the demodulator, to prepare the electrical output signal for the MCU input. MCU 214 is connected to display device 212. In some implementations the display device 212 is an LCD display. The MCU 214 is responsible for communicating with the RF demodulator 216 or the analogue to digital converter and the display device 212, in order to display the power measurement on the display device 212 based on the signal provided by the RF demodulator 216. Additionally, the MCU may be responsible for providing a graphical user interface to allow the user to issue particular instructions to OPMs. For example, the reader 212 may be equipped by a touch screen LCD display 212.

Figure 3:
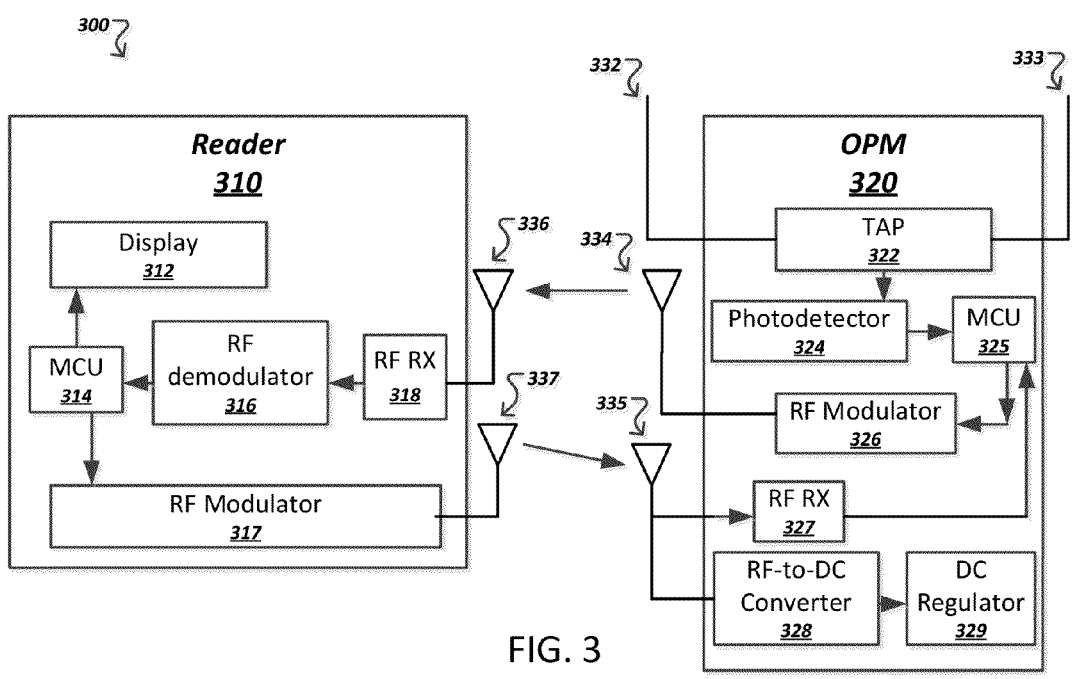
FIG. 3 is a block diagram of an alternative example implementation of a system comprising a wireless powered passive optical power meter comprising two antennas, and a wireless reader.

FIG. 3 is a block diagram of an alternative example implementation of a system comprising a wireless powered passive optical power meter comprising two antennas, and a wireless reader. The system of FIG. 3 is similar to the system of FIG. 2, however the system of FIG. 3 allows reader 310 and OPM 420 to send and receive OPM identification data. In some implementations, the OPM identification data is a unique power meter ID. This system allows the reader to send an OPM ID query to a particular OPM requesting specific measurement. For example, reader 310 may send a query to OPM 320 requesting a power measurement, a temperature measurement, and an OPM ID from OPM 320. This allows the reader 410 to request measurements from specific OPMs in particular branches of a network, such as, the network discussed with respect to FIG. 1. It also allows the reader 410 to request measurements from a particular group of OPMs or all OPMs in the range that the RF signal can reach.

The OPM 320 includes an optical input port 332 and an output optical port 333. The optical input port 332 receives an optical input to the OPM 320. Tap 322 is designed to tap the fiber between input port 332 and output port 333. In some implementations, using a beam splitter, the tap 322 diverts a small amount of the input to the photodetector 322, while the rest of the input is routed to output port 333.

In the implementation shown in FIG. 3, the output of the photodetector is transferred to a microcontroller unit MCU 335. An analogue to digital converter (not shown) may be interposed between the MCU and the photodetectors, to prepare the electrical output signal for the MCU input. Other devices may be attached to the MCU 335 to take measurements other than power. For example, a temperature measuring device may be connected to the MCU 335 to obtain temperature measurements. Similarly, other environmental factors or hazards to the network may be measured and monitored using the OPM. For example, humidity measurements may be obtained by connecting a humidity measuring device to the MCU 335.

In this implementation, the communication circuitry includes RF modulator 326 and MCU 335. The RF modulator 326 receives a signal encoded with the power measurement and the additional information provided by the other systems connected to the MCU. The RF modulator modulates the received signal for wireless transmission to the reader 310 via antenna 334.

The OPM 320 includes an antenna 335 connected to power circuitry, the power circuitry being configured to power the OPM 320 in response to receiving an RF signal from reader 310. The power circuitry includes an RF-to-DC converter 328 that is connected to antenna 335. The RF signal received by the antenna 335 is transmitted to the RF-to-DC converter 328, which in turn produces a DC voltage. The RF-to-DC converter 328 is also connected to a DC regulator 329. The DC voltage is transmitted to the DC regulator to ensure that the DC voltage is modified to provide appropriate voltage to each of the elements of the OPM 320. For example, the DC voltage may be converted to a higher voltage level. The DC regulator is connected, directly or indirectly, to each element of the OPM 320 that requires power. This configuration allows the components of OPM 320 to be powered wirelessly in response to receiving an RF signal at antenna 335. For example, the output of DC regulator 329 powers the photodetector 324, and RF modulator 326, and the MCU 335. Therefore, the operations described above regarding the photodetectors and communication circuitry occur in response to the OPM being powered by an RF signal from the reader 310.

The antenna 335 is also connected to RF RX 327. A portion of the signal received at antenna 335 is diverted to RF RX 327. The RF RX 327 provides the received signal encoded with the OPM ID query discussed above to MCU 335. The MCU may demodulate the received signal to extract the encoded ID query information. Alternatively, a demodulator (not shown) may be interposed between RF RX 327 and MCU 335 to perform the same function. In turn, the MCU obtains the measurements specified with by the query, and the identification data for OPM 320. For example, the MCU 335 may obtain the power measurement, temperature measurement, and a unique ID for OPM 320. The MCU 335 provides this data to RF modulator 326 for transmission to reader 310 via antenna 334 as discussed above.

The reader 310 of FIG. 3 provides multiple functions that include providing power and an ID query to the OPM 320, receiving and demodulating RF signals from the OPM 320, as well as displaying measurements corresponding to signals received from OPM 320. In some implementations the reader 310 is a portable wireless device that is internally powered by, for example, one or more batteries. In different implementations, the reader 310 is a stationary device that, for example, resides at a maintenance station and is in communication with one or more OPMs, such as OPM 320.

The OPM 320 includes an RF modulator 317 for modulating a signal into an RF signal. RF modulator 317 is connected to MCU 314 and antenna 336. The MCU 314 provides a signal containing information representing the ID query to the RF modulator 317. The RF modulator 317 modulates the signal from the MCU 314 to generate an RF signal modulated with the ID query information. The modulated signal is transferred to antenna 337, which in turn, transfers the signal to antenna 335. As discussed above, the signal received at antenna 335 from antenna 334 provides power through power circuitry to OPM 320.

In this implementation, the signal encoded with measurements and the OPM ID, is received at antenna 336. This RF signal from OPM 320 is transmitted from antenna 334 of OPM 320 to antenna 335 of reader 310. RF RX 418 is connected to RF demodulator 316 and antenna 336. The receiver RF RX 318 receives the signal encoded with the measurements and the OPM ID via antenna 336 and provides the signal to RF demodulator 316 for demodulation. The RF demodulator 316 demodulates the received signal to extract information from the received signal, such as, the measurements and the OPM ID for OPM 320. The RF demodulator 316 is also connected to MCU 314. The demodulated signal is provided to MCU 314. MCU 314 is connected to display device 312. In some implementations the display device 312 is an LCD display. The MCU 314 is responsible for communicating with the RF demodulator 316 and the display device 312, in order to display the measurements and the OPM ID for OPM 320 on the display device 312 based on the signal provided by the RF demodulator 316. Additionally, the MCU 335 may be responsible for providing a graphical user interface to allow the user to issue particular instructions to OPMs. For example, the reader 310 may be equipped by a touch screen LCD display 312.

In some implementations, the MCU 314 may compare the received ID of a particular OPM to the ID of the requested OPM. Naturally, if the ID is not matching, MCU 314 may disregard the received measurements.

Figure 4:
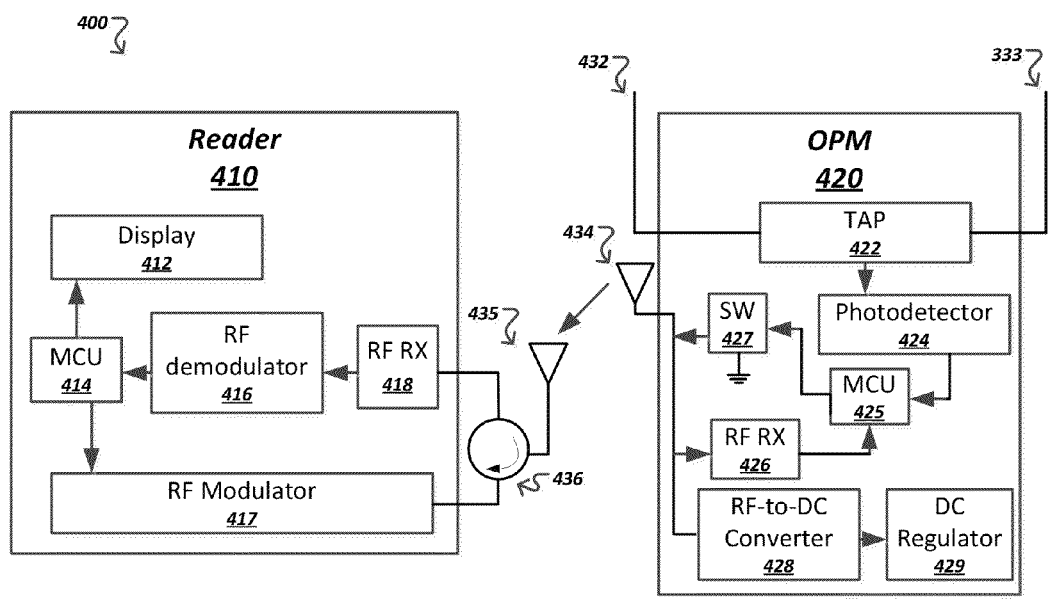
FIG. 4 is a block diagram of an example implementation of a system comprising a wireless powered passive optical power meter comprising a single antenna, and a wireless reader.

FIG. 4 shows an alternative implementation of a system comprising a wireless OPM and a reader. This particular implementation relies on backscatter effect instead of direct transmission. Backscattering is the phenomena where waves, or a portion of waves, are reflected back toward a point from which they originate. This alternative implementation utilizes only one antenna for each of OPM 420 and reader 410.

The OPM 420 includes an optical input port 432 and an output optical port 433. The optical input port 432 receives an optical input to the OPM 420. Tap 422 is designed to tap the fiber between input port 432 and output port 433. In some implementations, using a beam splitter, the tap 422 diverts a small amount of the input to the photodetector 422, while the rest of the input is routed to output port 433.

In this alternative implementation communication circuitry includes MCU 435, and switch SW 427. MCU 435 is connected to photodetector 424, SW 427, and RF RX 426. The MCU 435 receives a signal corresponding to a power measurement from photodetector 424. The MCU 435 is also connected to, and controls operation of SW 427. The SW 427 is connected to antenna 434. The SW 427 is also connected to an electrical ground, either directly or indirectly through an impedance load (not shown.) For example, a resistor and a capacitor (not shown) may be connected between SW 427 and the electrical ground. Since MCU 435 controls the operation of SW 427, MCU 427 can control the impedance load of antenna 434. Altering the impedance load of antenna 434, in turn, alters backscattering that occurs at antenna 434. Accordingly, this enables MCU 435 to encode information into backscattered signals by altering the backscattered signals. For example, MCU 435 can encode the power measurements from photodetector 424 on to a backscattered signal antenna 434. Similar to the discussions above with respect to FIG. 3, in some implementations, the MCU 435 may further encode the backscattered signal at antenna 434, with additional information such as temperature measurements, and other environmental measurements.

The antenna 434 is connected to power circuitry that is configured to power the OPM 420 in response to receiving an RF signal from reader 410. The power circuitry includes an RF-to-DC converter 428 that is connected to antenna 234. The RF signal received by the antenna 434 is transmitted to the RF-to-DC converter 428, which in turn produces a DC signal. The RF-to-DC converter 428 is also connected to a DC regulator 429. The DC signal is transmitted to the DC regulator to ensure that the DC signal is modified to provide appropriate power to each of the elements of the OPM 220. For example, the signal may be attenuated to reduce the power level of the DC signal. The DC regulator is connected, directly or in directly, to each element of the OPM 420 that requires power. This configuration allows the components of OPM 420 to be powered wirelessly in response to receiving an RF signal at antenna 434. For example, the output of DC regulator 429 powers the photodetector 424 and MCU 435. Therefore the operations described above regarding the photodetectors and communication circuitry occur in response to the OPM being powered by an RF signal from the reader 410.

In this alternative implementation, the RF signal from the reader 410 is further encoded with an ID query. The ID query is a query that requests measurements and an ID to be returned from a specific OPM. For example, an ID query may request power from OPM 420. As the RF signal for powering the OPM 420 is received by antenna 434, a first portion of the signal is routed to RF RX 426 and a second portion is routed to RF-to-DC converter 428. The RF RX 426 is connected to antenna 434 and MCU 435. The MCU 435 may demodulate the received signal to extract the encoded ID query information. Alternatively, a demodulator (not shown) may be interposed between RF RX 426 and MCU 435 to perform the same function. The MCU 435 receives an ID query from RF RX 426 or the demodulator (not shown), and in response encodes the OPM ID of OPM 420 along with the power measurement on to the backscattered signal at antenna 434.

The reader 410 of FIG. 4 provides multiple functions that include providing power and an ID query to the OPM 420 and displaying measurements corresponding to signals received from OPM 420. In some implementations the reader 410 is a portable wireless device that is internally powered by, for example, one or more batteries. In different implementations, the reader 410 is a stationary device that, for example, resides at a maintenance station and is in communication with one or more OPMs, such as OPM 420.

The OPM 420 includes an RF modulator 417 for modulating a signal into an RF signal. RF modulator 417 is connected to MCU 414 and RF circulator 436. The MCU 414 provides a signal containing information representing the ID query to the RF modulator 417. The RF modulator 417 modulates the signal from the MCU 414 to generate an RF signal modulated with the ID query information. The modulated signal is transferred to the RF circulator 436, which in turn, transfers the signal to antenna 435. As discussed above, the signal received at antenna 435 from antenna 434, provides power through power circuitry to OPM 420. In this implementation, the antenna 435 is the source of the signal that is backscattered at antenna 434.

In this implementation, the altered backscattered signal, described above, is received at antenna 435. The backscattered signal encoded with a power measurement and OPM ID for OPM 420 is transmitted from antenna 434 of OPM 420 to antenna 435 of reader 410. The RF circulator 436 transfers the backscattered signal from the antenna 435 to RF RX 418. RF RX 418 is connected to RF demodulator 416. The receiver RF RX 418 receives the backscattered signal encoded with the power measurement via antenna 436 and provides the signal to RF demodulator 416 for demodulation. The RF demodulator 416 demodulates the received signal to extract information from the received signal, such as, the power measurement and the OPM ID for OPM 420. The RF demodulator 416 is also connected to MCU 414. The demodulated signal is provided to MCU 414. MCU 214 is connected to display device 412. In some implementations the display device 412 is an LCD display. The MCU 414 is responsible for communicating with the RF demodulator 416 and the display device 412, in order to display the power measurement and the OPM ID for OPM 420 on the display device 412 based on the signal provided by the RF demodulator 416. Additionally, the MCU may be responsible for providing a graphical user interface to allow the user to issue particular instructions to OPMs. For example, the reader 410 may be equipped by a touch screen LCD display 412.

In some implementations, the MCU 414 may compare the received ID of a particular OPM to the ID of the requested OPM. Naturally, if the ID is not matching, MCU 414 may disregard the received measurements.

Figure 5:
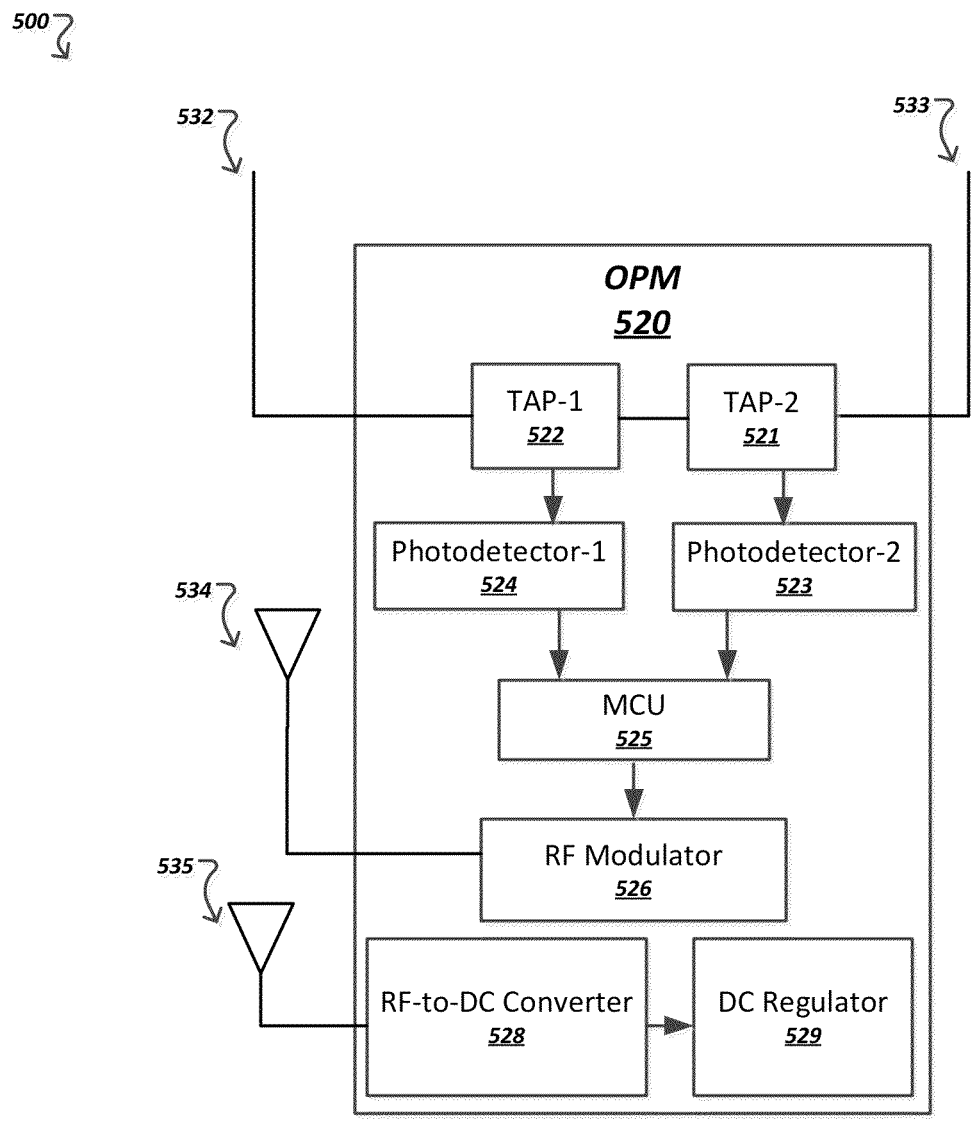
FIG. 5 is a block diagram of an example implementation of a bidirectional, dual-wavelength wireless powered passive optical power meter comprising two antennas.

FIG. 5 is a block diagram of an example implementation of a bidirectional, dual-wavelength wireless powered passive optical power meter comprising two antennas. The operation of OPM 520 is sustainably similar to the operations of OPM 320 and OPM 220 discussed above. However, the OPM 520 can be configured to operate as a bidirectional OPM or a dual-wavelength OPM.

OPM 520 contains two taps, TAP-1 522 and TAP-2 521, which are connected to photodetectors-1 524 and photodetectors-2 525 respectively. TAP-1 522 and TAP-2 may be configured with opposite alignment such that Tap-1 taps the signal traveling from port 533 to port 532, and TAP-2 taps the signal traveling from port 532 to port 533. Since each tap is connected to a separate photodetector, each photodetectors connected to MCU 535, the measurements from both photodetectors is transferred to MCU 535. This set up allows OPM 520 to obtain measurements from a fiber network, when the terminals 532 and 533 are connected to fiber of the fiber network in a forward or a reverse direction. In other words, terminal 532 and terminal 533 can represent the input to OPM 520 interchangeably. Similarly, terminal 532 and terminal 533 can represent the output to OPM 520 interchangeably.

In a different implementation, TAP-1 522 and TAP-2 521 can be configured to tap different wavelengths. For example, TAP-1 522 may be configured to tap a 1550 nm wavelength, while TAP-2 may be configured to tap a 1330 nm wavelength. This allows OPM 520 to measure two different signals that are traveling simultaneously through the same fiber. As wavelength multiplexing is one of the inherent advantages of optical networks, this dual-wavelength configuration allows for monitoring optical networks that utilize wavelength multiplexing. It is understood that this implementation represents two taps only, however, additional taps can be incorporated to monitor additional wavelength, in a manner similar to the above. It is also understood that the wavelength discussed above is exemplary and not limiting. The invention may operate with a wide variety of wavelength.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. Moreover, the separation of various system components in the embodiments described above should not be understood as requiring such separation in all embodiments, and it should be understood that the described components and systems can generally be integrated together in a single product.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system comprising, an optical power meter comprising:
   one or more antennas;
   a power circuit connected to one of the one or more antennas, the circuit including an RF to DC converter that generates a DC power signal that provides a DC power source for the optical power meter from an RF signal received by the one or more antennas;
   an optical input port that receives an optical input signal;
   a photodetector that generates a power measurement signal that measures the power of the optical input signal; and
   a communication circuit that is connected to the one or more antenna, the photodetector, and the power circuit and when powered by the DC power source generates a modulation signal that is responsive to the power measurement signal and that causes the one of the one or more antennas to convey the power measurement signal to a reader device that is transmitting the RF signal.

2. The optical power meter of claim 1, wherein the optical power meter comprises a first and a second antenna;
   wherein the first antenna is connected to the power circuit such that receiving the RF signal by the first antenna causes the power circuit to generate a DC power signal;
   wherein the second antenna is connected to the communication circuit; and
   wherein the communication circuit generates and transfers, by the second antenna to the reader device, a modulated signal specifying the power measurement signal to the reader device, in response to being powered by a DC power signal from the power circuit.

3. The optical power meter of claim 2, wherein the modulated signal further specifies optical meter identification data.

4. The optical power meter of claim 3, wherein the identification data is a unique power meter ID.

5. The optical power meter of claim 2, further comprising a query detection circuit connected to the first antenna and to the communication circuit, such that when an RF signal containing a query is received by the first antenna the query detection circuit causes the communication circuit to generate and transfer a modulated signal further encoded with optical meter identification data.

6. The optical power meter of claim 1, further comprising a temperature measurement circuit coupled to the power circuit and when powered by the DC power source generates a temperature measurement signal that measures the temperature surrounding the optical input signal.

7. The optical power meter of claim 1, further comprising a fiber output port, the fiber output port being an output port that produces an output optical signal, the output optical signal being, at least, a portion of the input optical signal.

8. The optical power meter of claim 1, wherein the optical power meter comprises a first antenna, the first antenna being connected to the power circuit such that receiving the RF signal by the first antenna causes the power circuit to generate a DC power signal, the first antenna being also connected to the communication circuit;
   wherein the communication circuit when powered modulates an impedance connected to the antenna such that modulation, in turn, alters a backscattered RF signal, the backscattered RF signal being produced by the RF signal, the RF signal being transmitted from the reader device; and
   wherein the backscattered RF signal is altered to be encoded with data specifying the power measurement signal to the reader device.

9. The optical power meter of claim 8, wherein the modulated signal further specifies optical meter identification data.

10. The optical power meter of claim 8, further comprising a query detection circuit connected to the first antenna and to the communication circuit, such that when an RF signal containing a query is received by the first antenna the query detection circuit causes the communication circuit to further modulate the backscattered RF signal with optical meter identification data.

11. The system of claim 1, further comprising, an optical power reader comprising:
   a display device;
   one or more antennas; and
   a communication circuit that is connected to the one or more antennas and the display device, the communication circuit being a circuit that produces an RF signal for transmission by the one or more antennas to the optical power meter, and also being a circuit that receives an RF signal from the optical power meter and in response to receiving the RF signal from the optical power meter, at the one or more antennas, produces a signal that causes the display device to display data encoded in received RF signal, the data comprising a power measurement signal.

12. The optical power reader of claim 11, wherein the RF signal produced by the communication circuit for transfer by the one or more antennas to the optical power meter, contains data specifying a query requesting identification data, the identification data being data specifying a unique ID for the optical power meter.

13. The optical power reader of claim 11, wherein the received RF signal from the optical power meter includes data specifying environmental data for an area surrounding an optical input signal of the optical power meter.

14. The optical power reader of claim 11, wherein the optical power reader comprises a first antenna and a second antenna, the first antenna being connected to the communication circuit such that produced RF signal is transmitted by the first antenna, the second antenna being dedicated to receiving the RF signal from the optical power meter, such that the RF signal is received by the second antenna.

15. The optical power reader of claim 11, wherein the optical power reader comprises a first antenna, the first antenna being connected to the communication circuit such that produced RF signal is transmitted by the first antenna, and such that the RF signal from the optical power meter is received by the first antenna.

16. A method for measuring optical power by an optical power meter, comprising:
   receiving, by one or more antennas, an RF signal;
   generating, by a power circuit including an RF to DC converter, a power signal from the received RF signal that provides a DC power source for the optical power meter;
   receiving, by an optical input port, an optical input signal;
   generating, by a photodetector, a power measurement signal that measures the power of the optical input signal; and
   in response to generating a power signal that provides a DC power source for the optical power meter, generating by a communication circuit a modulation signal that is responsive to the power measurement signal and that causes one of the one or more antennas to convey the power measurement signal to a reader device that is transmitting the RF signal received by the one or more antenna.

17. The method of claim 16, wherein receiving, by one or more antenna, an RF signal further comprises receiving, by a first antenna, an RF signal wherein the first antenna is connected to the power circuit such that receiving the RF signal by the first antenna causes the power circuit to generate a DC power signal; and
   wherein conveying the power measurement signal to the reader device that is transmitting the RF signal further comprises transferring, by a second antenna, a modulated signal specifying the power measurement signal to the reader device, in response to the communication circuit being powered by the DC power signal from the power circuit.

18. The method of claim 16, wherein receiving, by one or more antenna, an RF signal further comprises receiving, by a first antenna, an RF signal wherein the first antenna is connected to the power circuit such that receiving the RF signal by the first antenna causes the power circuit to generate a DC power signal; and
   wherein conveying the power measurement signal to the reader device that is transmitting the RF signal further comprises modulating an impedance connected to the first antenna such that the modulation, in turn, alters a backscattered RF signal, the backscattered RF signal being produced by the RF signal transmitted from the reader device, wherein the backscattered RF signal is altered to be encoded with data specifying the power measurement signal to the reader device.

* * * * *